United States Patent
Deryagin

(10) Patent No.: US 9,740,927 B2
(45) Date of Patent: Aug. 22, 2017

(54) IDENTIFYING SCREENSHOTS WITHIN DOCUMENT IMAGES

(71) Applicant: ABBYY Development LLC, Moscow (RU)

(72) Inventor: Dmitry Deryagin, Moscow (RU)

(73) Assignee: ABBYY Development LLC (RU)

( * ) Notice: Subject to any disclaimer, the term of this patent is extended or adjusted under 35 U.S.C. 154(b) by 257 days.

(21) Appl. No.: 14/564,454

(22) Filed: Dec. 9, 2014

(65) Prior Publication Data

US 2016/0078292 A1    Mar. 17, 2016

(30) Foreign Application Priority Data

Sep. 17, 2014 (RU) ................................ 2014137551

(51) Int. Cl.
G06K 9/00 (2006.01)
G06K 7/10 (2006.01)
G06T 7/00 (2017.01)

(52) U.S. Cl.
CPC ..... *G06K 9/00456* (2013.01); *G06K 9/00463* (2013.01); *G06T 7/0079* (2013.01)

(58) Field of Classification Search
CPC .......... G06K 9/00288; G06K 9/00456; G06K 9/00442; G06K 9/00449; G06K 2209/01; G06F 17/30277; G07D 7/002; G06T 7/0079

USPC ................. 382/165, 173, 181, 321
See application file for complete search history.

(56) References Cited

U.S. PATENT DOCUMENTS

| | | | |
|---|---|---|---|
| 7,428,700 B2 * | 9/2008 | Wen | G06F 17/218 707/E17.093 |
| 8,478,767 B2 * | 7/2013 | Kern | G06T 15/30 463/31 |
| 8,600,173 B2 * | 12/2013 | Esposito | G06K 9/00442 382/224 |
| 8,634,644 B2 | 1/2014 | Chiu et al. | |
| 8,762,873 B2 * | 6/2014 | Pnueli | G06F 8/38 715/763 |
| 8,849,725 B2 * | 9/2014 | Duan | G06F 17/30873 706/12 |
| 8,984,390 B2 * | 3/2015 | Aymeloglu | G06F 17/2288 715/207 |

* cited by examiner

*Primary Examiner* — Kanjibhai Patel
(74) *Attorney, Agent, or Firm* — LeighAnn Weiland; Veronica Weinstein

(57) ABSTRACT

Systems and methods for identifying screenshots within document images. An example method comprises: receiving an image of at least a part of a document; identifying, within the image, a polygonal object having a visually distinct border comprising a plurality of edges of one or more intersecting rectangles; asserting a screenshot image hypothesis with respect to the identified polygonal object; and responsive to evaluating at least one condition associated with one or more attributes of the identified polygonal object, classifying the identified polygonal object as a screenshot image.

25 Claims, 9 Drawing Sheets

IDENTIFYING SCREENSHOTS WITHIN DOCUMENT IMAGES

CROSS REFERENCE TO RELATED APPLICATIONS

This application claims the benefit of priority to Russian patent application No. 2014137551, filed Sep. 17, 2014; the disclosure of which is incorporated herein by reference.

TECHNICAL FIELD

The present disclosure is generally related to computing devices, and is more specifically related to systems and methods for processing electronic documents.

BACKGROUND

An electronic document may be produced by scanning or otherwise acquiring an image of a paper document and performing optical character recognition to produce the text associated with the document. The document may contain not only text. It may also contain tables, images and screenshots which, when compared to images, have some unevenly distributed text. It can be problematic to indentify screenshots during the recognition process. The screenshot may be easily confused with a table or may be erroneously divided into several individual parts (for example, few text blocks comprising the text of the screenshot; an image block comprising a window's header, etc.).

The present invention allows to distinguish screenshots from other types of structures within a document image. As a result, the system is not going to perform the optical character recognition process on a portion of the document image corresponding to the identified screenshot and this portion will be saved as an image.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
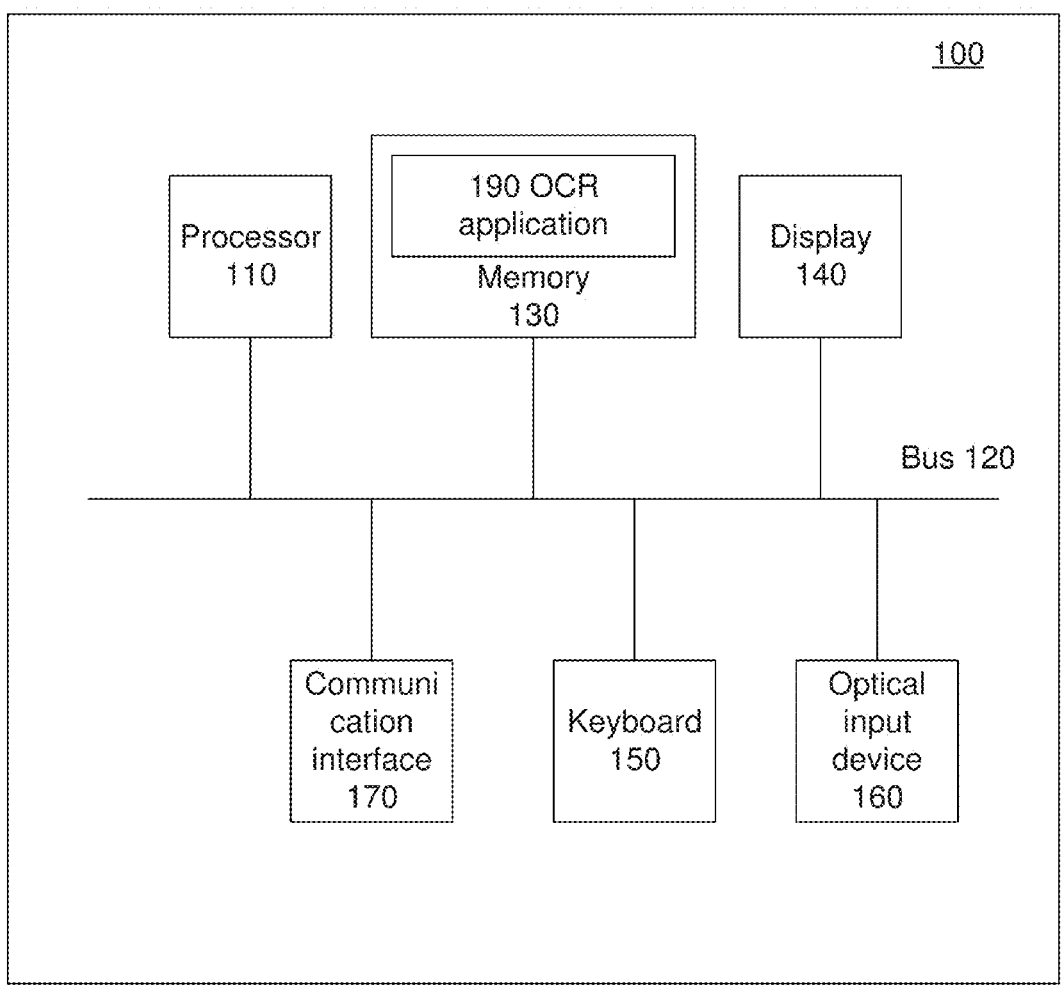
FIG. 1 depicts a block diagram of one embodiment of a computing device operating in accordance with one or more aspects of the present disclosure.

Described herein are methods and systems for identifying screenshots within document images.

"Electronic document" herein shall refer to a file comprising one or more digital content items that may be visually rendered to provide a visual representation of the electronic document (e.g., on a display or a printed material). An electronic document may be produced by scanning or otherwise acquiring an image of a paper document and performing optical character recognition to produce the text associated with the document. In various illustrative examples, electronic documents may conform to certain file formats, such as PDF, DOC, ODT, etc.

"Computing device" herein shall refer to a data processing device having a general purpose processor, a memory, and at least one communication interface. Examples of computing devices that may employ the methods described herein include, without limitation, desktop computers, notebook computers, tablet computers, and smart phones.

An optical character recognition (OCR) system may acquire an image of a paper document and transform the image into a computer-readable and searchable format comprising the textual information extracted from the image of the paper document. In various illustrative examples, an original paper document may comprise one or more pages, and thus the document image may comprise images of one or more document pages. In the following description, "document image" shall refer to an image of at least a part of the original document (e.g., a document page).

In certain implementations, upon acquiring and optionally pre-processing the document image, an OCR system may analyze the image to determine the physical structure of the document, which may comprise portions of various types (e.g., text blocks, image blocks, or table blocks). The OCR system may then perform the character recognition in accordance with the document physical structure, and produce an editable electronic document corresponding to the original paper document.

In certain implementations, the OCR system may identify, within a document image, a plurality of primitive objects, including vertical and horizontal black separators, vertical and horizontal dotted separators, vertical and horizontal gradient separators, inverted zones, word fragments, and white separators. Based on the types, composition and/or mutual arrangement of the detected primitive objects and using one or more reference document structures, the OCR system may assert certain hypotheses with respect to the physical structure of the document. Such hypotheses may include one or more hypotheses with respect to classification and/or attributes of portions (e.g., rectangular objects) of the document image. For example, with respect to a particular rectangular object located within the image, the OCR system may assert and test the following hypotheses: the object comprises text, the object comprises a picture, the object comprises a table, the object comprises a diagram, and the object comprises a screenshot image. The OCR system may then select the best hypothesis in order to classify the rectangular object as pertaining to one of the known object types (e.g., a text block, an image block, or a table blocks).

In an illustrative example, the OCR system may identify, within the document image, a polygonal object having a visually distinct border produced by the edges of one or more intersecting rectangles. The OCR system may assert one or more hypotheses with respect to the classification of the portion of the document image comprised by the identified polygonal object, including a hypothesis that the identified polygonal object comprises a screenshot image. The OCR system may then test the asserted hypotheses by evaluating one or more conditions associated with one or more attributes of the identified polygonal object, as described in more details herein below.

Various aspects of the above referenced methods and systems are described in details herein below by way of examples, rather than by way of limitation.

FIG. 1 depicts a block diagram of one illustrative example of a computing device 100 operating in accordance with one or more aspects of the present disclosure. In illustrative examples, computing device 100 may be provided by various computing devices including a tablet computer, a smart phone, a notebook computer, or a desktop computer.

Computing device 100 may comprise a processor 110 coupled to a system bus 120. Other devices coupled to system bus 120 may include a memory 130, a display 140, a keyboard 150, an optical input device 160, and one or more communication interfaces 170. The term "coupled" herein shall refer to being electrically connected and/or communicatively coupled via one or more interface devices, adapters and the like.

In various illustrative examples, processor 110 may be provided by one or more processing devices, such as general purpose and/or specialized processors. Memory 130 may comprise one or more volatile memory devices (for example, RAM chips), one or more non-volatile memory devices (for example, ROM or EEPROM chips), and/or one or more storage memory devices (for example, optical or magnetic disks). Optical input device 160 may be provided by a scanner or a still image camera configured to acquire the light reflected by the objects situated within its field of view. An example of a computing device implementing aspects of the present disclosure will be discussed in more detail below with reference to FIG. 9.

Memory 130 may store instructions of application 190 for performing optical character recognition. In certain implementations, application 190 may perform methods of identifying screenshots within document images, in accordance with one or more aspects of the present disclosure. In an illustrative example, application 190 may be implemented as a function to be invoked via a user interface of another application. Alternatively, application 190 may be implemented as a standalone application.

Figure 2:
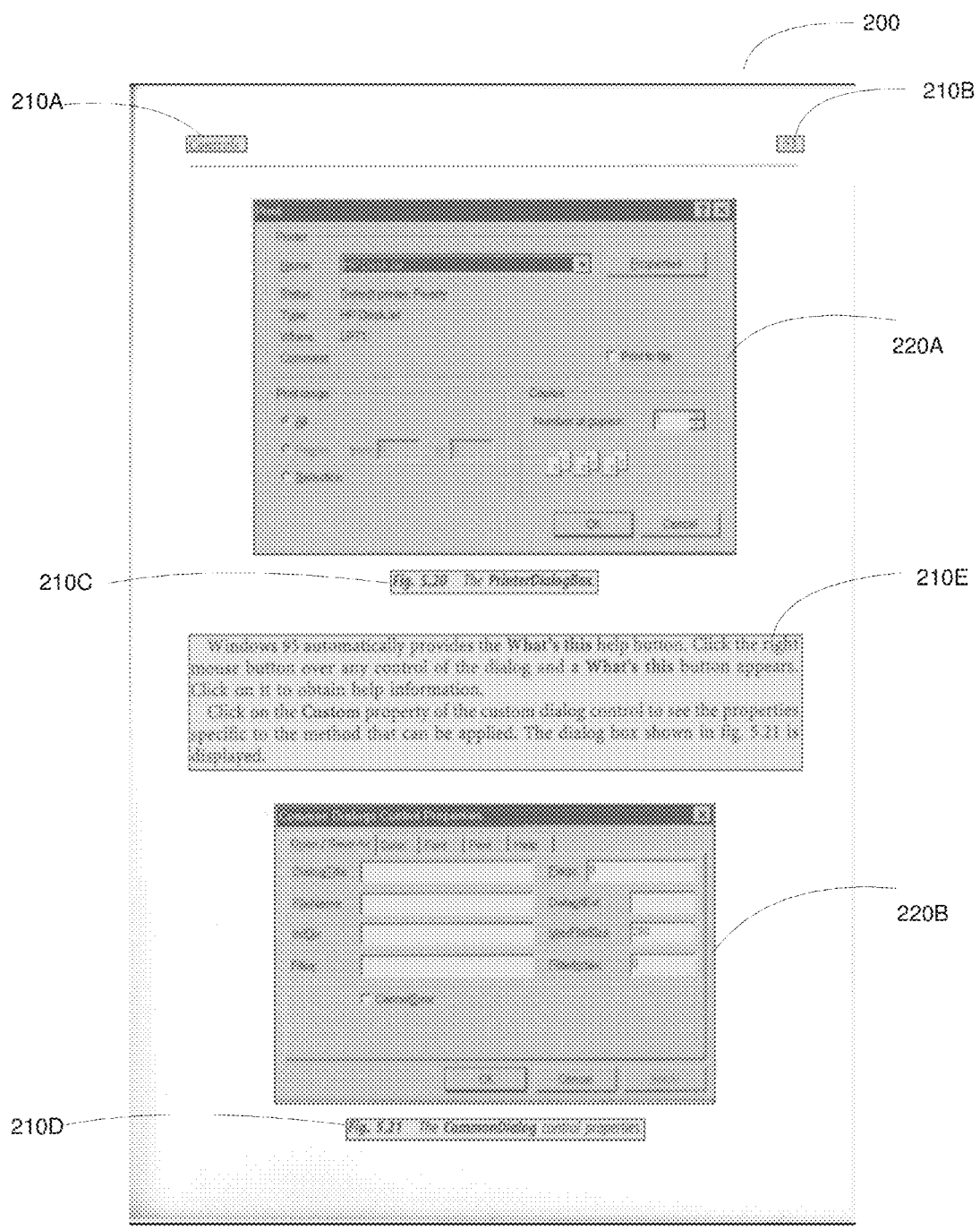
FIG. 2 illustrates an example of a document image that may be processed by an optical character recognition (OCR) application, in accordance with one or more aspects of the present disclosure.

In an illustrative example, computing device 100 may acquire a document image. FIG. 2 illustrates an example of a document image 200 that may be processed by application 190 running on computing device 100 in accordance with one or more aspects of the present disclosure. The layout of the document may comprise text blocks 210A-210E (including running header 210A, page number 210B, figure captions 210C and 210D, and text column 210E) screenshot images 220A-220B. The illustrated elements of the document layout have been selected for illustrative purposes only and are not intended to limit the scope of this disclosure in any way.

Application 190 may analyze the acquired document image 200 to detect, within the document image, a plurality of primitive objects, including vertical and horizontal black separators, vertical and horizontal dotted separators, vertical and horizontal gradient separators, inverted zones, word fragments, and white separators. Based on the types, composition and/or mutual arrangement of the detected primitive objects and using one or more reference document structures, application 190 may assert certain hypotheses with respect to the physical structure of the document.

Such hypotheses may include one or more hypotheses with respect to classification and/or attributes of portions (e.g., rectangular or other polygonal objects) of the document image. For example, with respect to a particular rectangular object located within the document, application 190 may assert and test the following hypotheses: the object comprises text, the object comprises a picture, the object comprises a table, the object comprises a diagram, and the object comprises a screenshot image. Application 190 may then select the best hypothesis in order to classify the rectangular object as pertaining to one of the known object types (e.g., text block, image block, or table blocks).

In certain implementations, the document structure hypotheses may be generated based on one or more reference models of possible document structures. In various illustrative examples, the reference models of possible structures may include models representing a research paper, a patent, a patent application, a business letter, an agreement, etc. Each reference structure model may describe one or more essential and/or one or more optional parts of the structure, as well as the mutual arrangement of the parts within the document. In an illustrative example, a research paper model may comprise a two-column text, a page footer and/or page header, a title, a sub-title, one or more inserts, one or more tables, pictures, diagrams, flowcharts, screenshot images, endnotes, footnotes, and/or other optional parts.

In certain implementations, the document structure hypotheses may be generated in the descending order of their respective probabilities, so that a more probable document structure hypothesis is generated before a less probable document structure hypothesis.

Application 190 may apply a certain set of rules to identify one or more objects (e.g., rectangular objects) with respect to which one or more hypotheses may be asserted regarding their respective classification and/or attributes. In an illustrative example, one or more classification hypotheses may be asserted with respect to one or more objects contained within a column of text, as schematically illustrated by FIG. 3.

Figure 3:
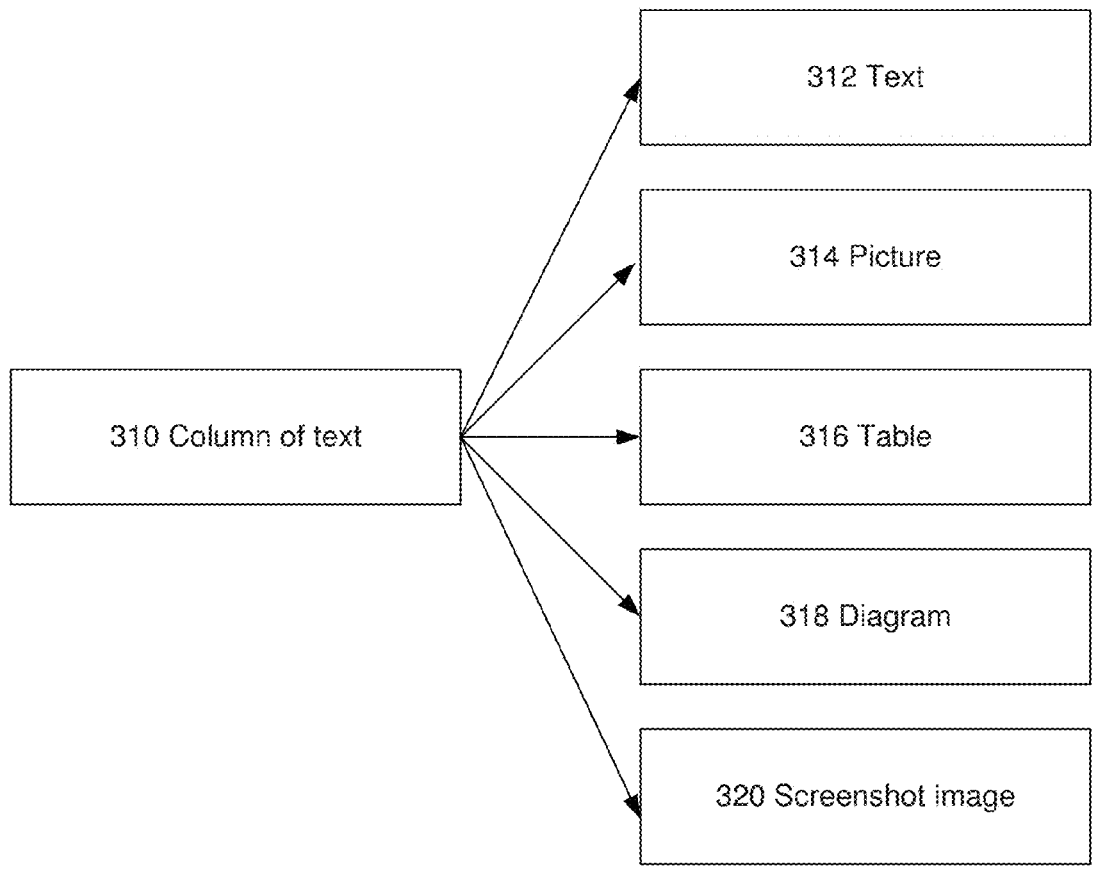
FIG. 3 schematically illustrates various example hypotheses that an OCR application may assert with respect to document elements contained within a column of text, in accordance with one or more aspects of the present disclosure.

FIG. 3 schematically illustrates various example hypotheses that application 190 may assert with respect to the objects contained within a column of text 310. The set of example hypotheses may include a text 312, a picture 314, a table 316, a diagram 318, and/or a screenshot image 320. In certain implementations, the asserted hypotheses may be tested as competing hypothesis, such that the testing process should yield a single best hypothesis. Based on the best selected hypothesis with respect to the classification of the objects, application 190 may perform further processing of the corresponding portions of the document image (e.g., apply an OCR method to produce the text associated with the corresponding portions of page image).

Figure 4:
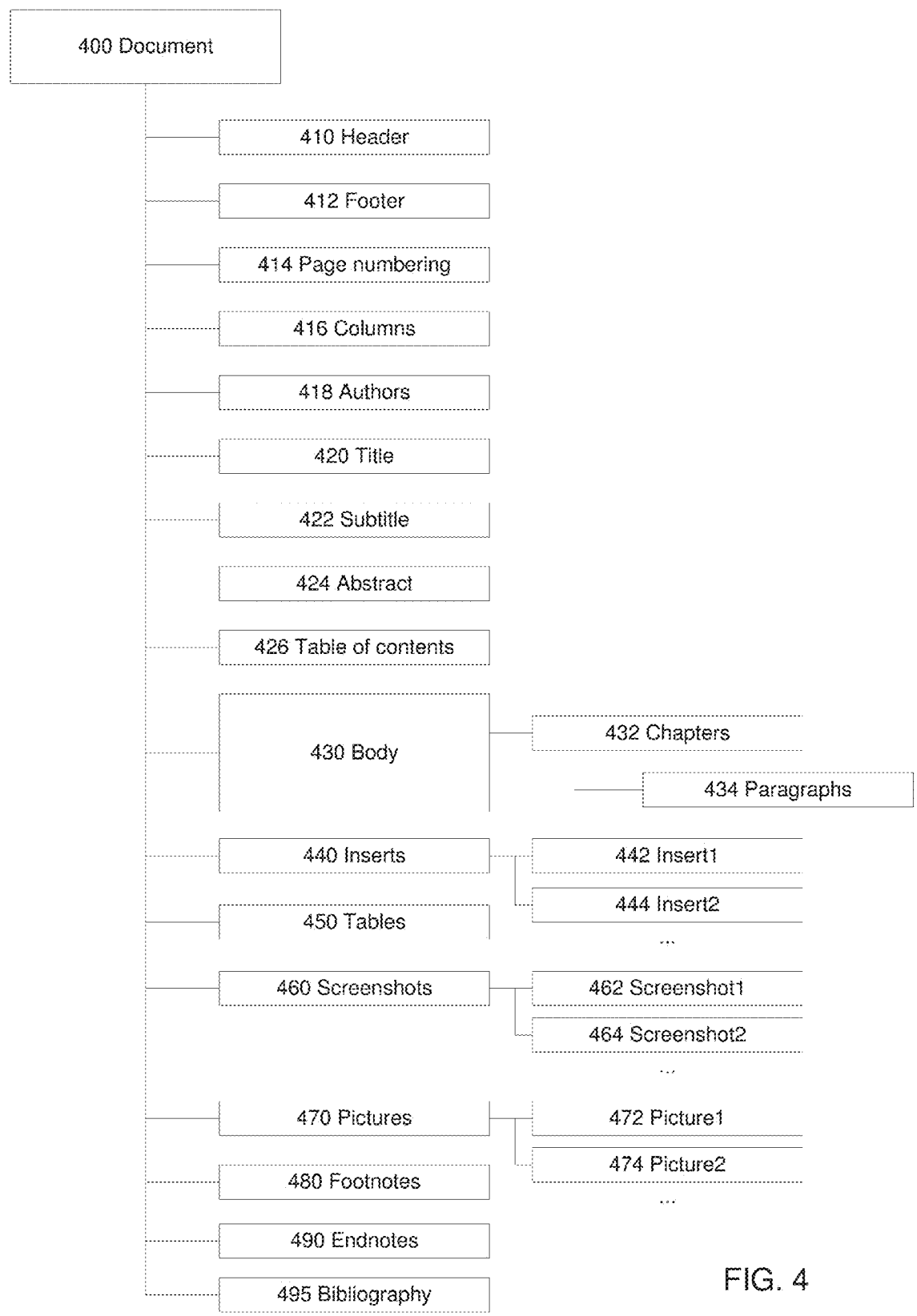
FIG. 4 illustrates an example of the logical structure of a document that may be produced by an OCR application, in accordance with one or more aspects of the present disclosure.

FIG. 4 illustrates an example of the logical structure of a document that may be produced by application 190 in accordance with one or more aspects of the present disclosure. Referring now to FIG. 4, the logical structure of document 400 may comprise a plurality of blocks, including header 410, footer 412, page numbering 414, columns 416, authors 418, title 420, subtitle 422, abstract 424, table of contents 426, and document body 430. In the illustrative example of FIG. 4, document body 430 may further comprise a plurality of chapters 432, and each chapter 432 may, in turn, comprise one or more paragraphs 434. In various illustrative examples, the logical structure of document 400 may further comprise inserts 440, tables 450, screenshot images 460, pictures 470, footnotes 480, endnotes 490, and/or bibliography 495, as schematically illustrated by FIG. 4.

As schematically illustrated by FIG. 2, the original document may comprise one or more screenshot images 220. In accordance with one or more aspects of the present disclosure, application 190 may be configured to detect such images within the document image and identify them as screenshot images (e.g., element 460 as schematically illustrated by FIG. 4). Identifying certain blocks as screenshot images, and in particular distinguishing the screenshot images from table blocks and/or text blocks may be particularly useful for determining the further processing operations with respect to corresponding portions of the document image (e.g., whether to attempt optical character recognition with respect to the portion of the document image corresponding to the identified structural blocks).

In an illustrative example, application 190 may identify, within the document image, a candidate polygonal object having a visually distinct border comprising edges of one or more intersecting rectangles. Responsive to identifying the candidate object, application 190 may assert a hypothesis that the object contains a screenshot image. In certain implementations, identifying the candidate object within the document image may comprise identifying three or more edges of the object's polygonal (e.g., rectangular) border.

Figure 5:
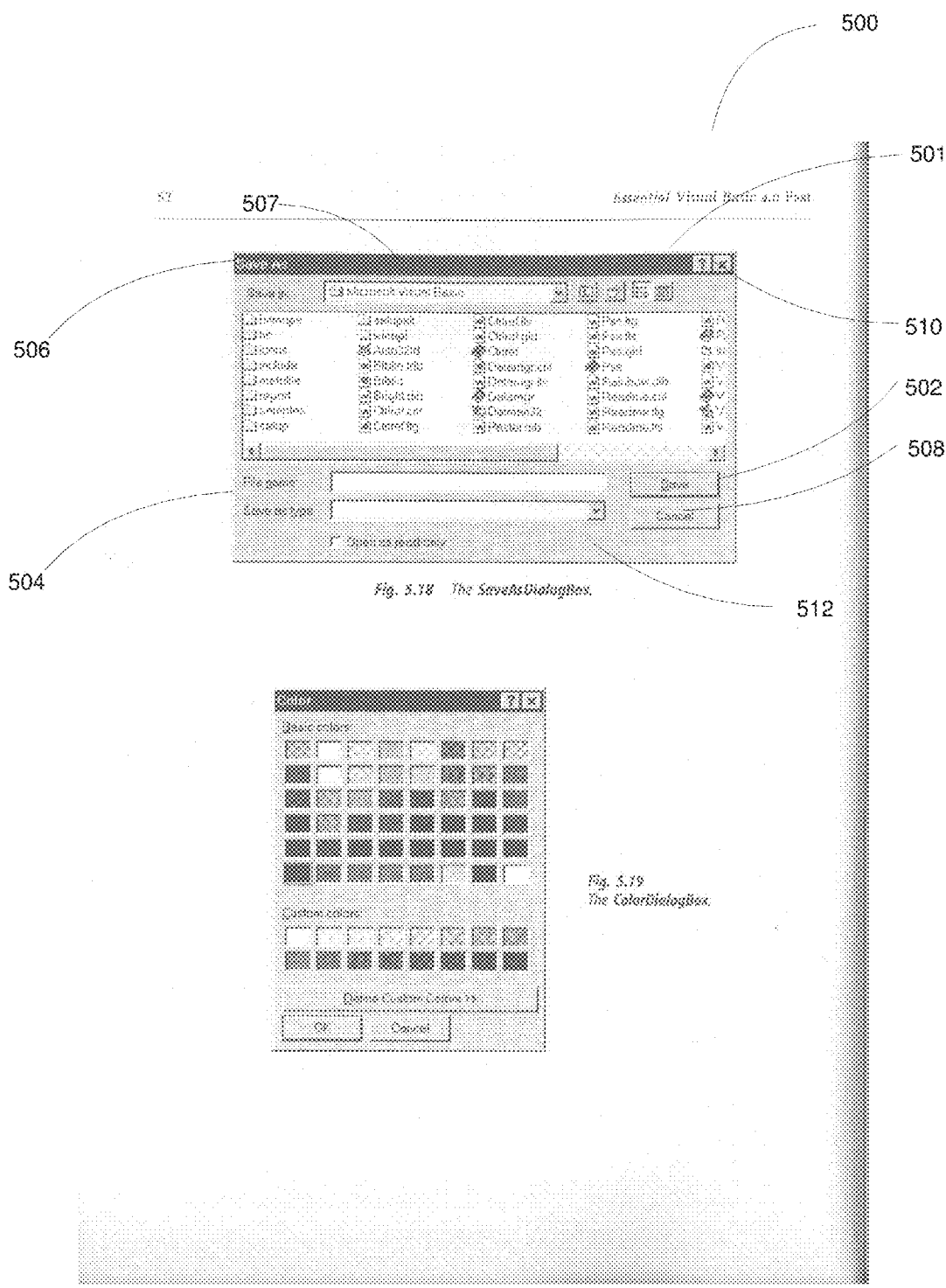
FIGS. 5-6 schematically illustrate various examples of document images that may be processed by an optical character recognition (OCR) application, in accordance with one or more aspects of the present disclosure.

In certain implementations, one or more graphical primitives comprised by the object border may be provided by a visual separator (e.g., a straight line, or a substantially rectangular element) of a color which is visually distinct from the color of any neighboring element. FIG. 5 schematically illustrates an example document image 500 comprising a screenshot object 501 that in turn comprises various separators. In an illustrative example, a visual separator 502 may have a substantially solid fill pattern comprising a single color (e.g., black). In another illustrative example, a visual separator 504 may be represented by a line dissecting the background so that the background color on one side of the separator line is different from the background color on another side of the separator line. In yet another illustrative example, a visual separator may have a gradient fill pattern comprising one or more colors (e.g., a fill pattern gradually changing from a first intensity of the base color to a second intensity of the based color, or from a first solid color to a second solid color). In yet another illustrative example, a visual separator 506 may be represented by an inverse background rectangular element comprising a text (e.g., a window title), such that the background color of the rectangular element is visually distinct from the background color of the neighboring document image objects, and the color of the text coincides with the background color of the neighboring document image objects.

Responsive to identifying the candidate object and asserting a hypothesis that the object contains a screenshot image, application 190 may test the asserted hypothesis by evaluating one or more conditions associated with one or more attributes of the identified candidate object. In an illustrative example, a hypothesis testing condition may require application 190 to identify a window header element within the candidate object of the document image, under the assumption that a screenshot image would comprise one or more screen windows having respective associated headers (similar to window header 507).

In another illustrative example, a hypothesis testing condition may require application 190 to identify one or more button images 508 represented by relatively small (with respect to the size of the screenshot image) objects comprising a visually distinct rectangular border and a text string.

In yet another illustrative example, a hypothesis testing condition may require application 190 to identify, within the candidate object of the document image, a background color and/or a fill pattern that is different from the background color and/or the fill pattern of the neighboring objects of the document image, under the assumption that the neighboring document objects would comprise a text having a substantially white background, while a screenshot image would usually have a visible fill pattern within the background (e.g., a gray background of a black-and-white screenshot).

In yet another illustrative example, a hypothesis testing condition may require application 190 to ascertain that a ratio of the height to the width of the identified rectangular border of the candidate object falls within a pre-defined interval, the interval comprising values of the height to width ratio that are typical for displays that may be employed by various computing devices, under the assumption that a screenshot would usually be scaled proportionally, i.e., by keeping the screen height to width ratio.

Figure 6:
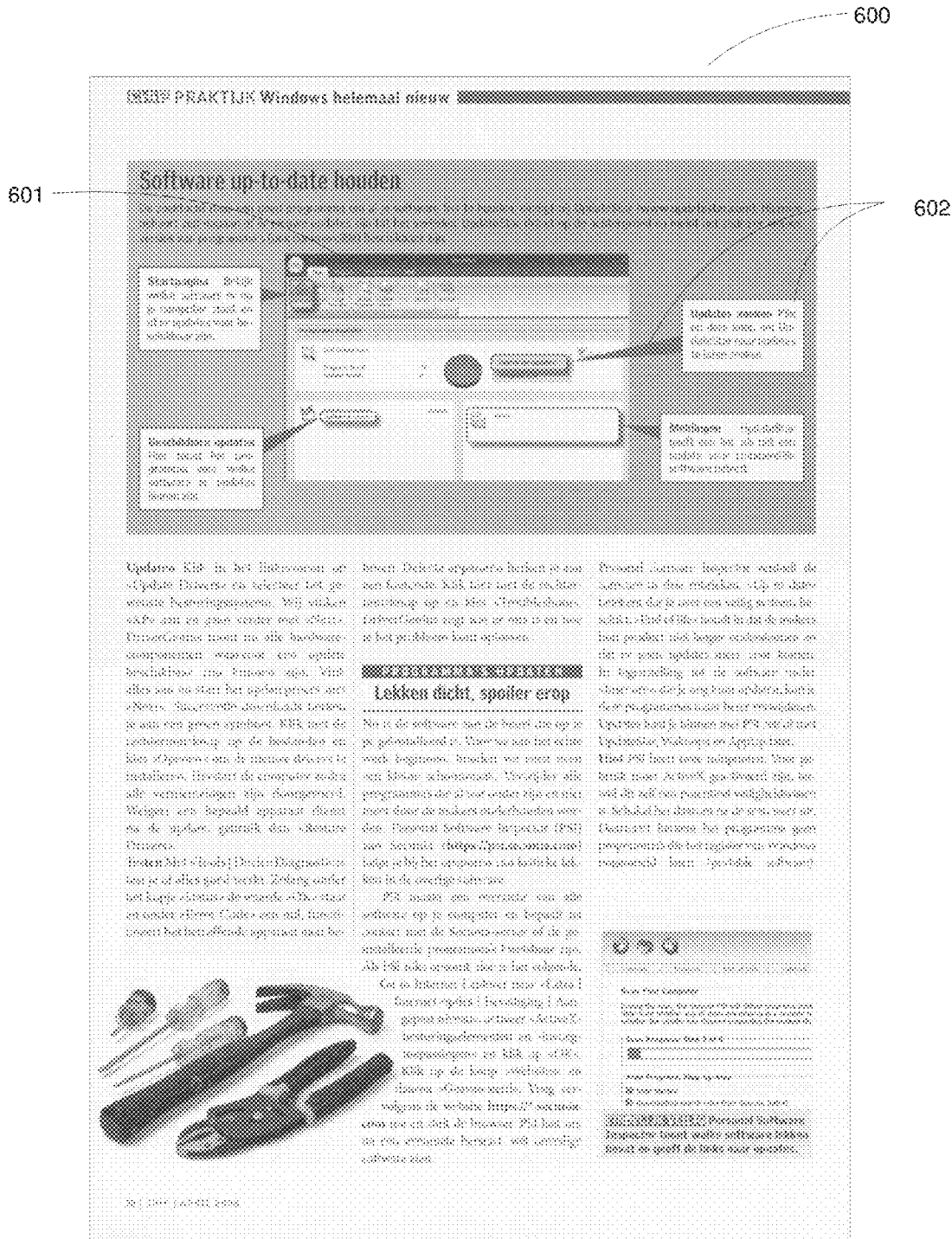

In yet another illustrative example, a hypothesis testing condition may require application 190 to identify one or more callout graphical elements that are visually associated with the candidate object. "Callout" herein shall refer to a graphical element that contains a text associated with another element of the screenshot image (e.g., a comment field that is associated with one or more buttons within the screenshot image). FIG. 6 schematically illustrates an example document image 600 comprising a screenshot object 601 that is visually associated with call-outs 602.

In yet another illustrative example, a hypothesis testing condition may require application 190 to identify, within the candidate area, a plurality of grayscale items, under the assumption that a screenshot image may comprise a plurality of lines of text which may become blurred when the screenshot image is scaled down.

In yet another illustrative example, a hypothesis testing condition may require application 190 to identify one or more text objects having a font size that is smaller than the font size of one or more text objects that are located outside of the candidate object, under the assumption that a screenshot may have been scaled down before inserting into the original document.

In yet another illustrative example, a hypothesis testing condition may require application 190 to identify one or more images of window controls (such as window close control 510 schematically illustrated by FIG. 5, or window minimize/maximize controls) located in the upper left and/or upper right corners of the screenshot image, under the assumption that a screenshot image would comprise one or more standard window controls.

In yet another illustrative example, a hypothesis testing condition may require application 190 to identify one or more textured zones which after image binarization (i.e., conversion to black and white) would become a collection of randomly located and sized relatively small (with respect to the size of the screenshot image) black and white dots. In a monochrome image, the background part of the screenshot (e.g., background 512 of screenshot 501 as schematically illustrated by FIG. 5) may be represented by a textured zone.

In yet another illustrative example, a hypothesis testing condition may require application 190 to identify various text strings that could not be structured into paragraphs, with a relatively large (with respect to the total number of lines within the screenshot object) number of empty text lines.

Upon determining that one or more testing conditions applied to candidate object are satisfied, application 190 may classify the candidate object as comprising a screenshot image. Application 190 may then perform the optical character recognition of the document image using the identified document structure. In particular, optical character recognition may be performed for the portions of image corresponding to identified text blocks and table blocks, while skipping the portions of image corresponding to identified image blocks and screenshot image. As a result of the character recognition process, produced is an editable electronic document having a structure that is substantially similar to the structure of the original paper document. In certain implementations, OCR application 190 may be designed to produce electronic documents of a certain user-selectable format (e.g., PDF, DOC, ODT, etc.).

Figure 7:
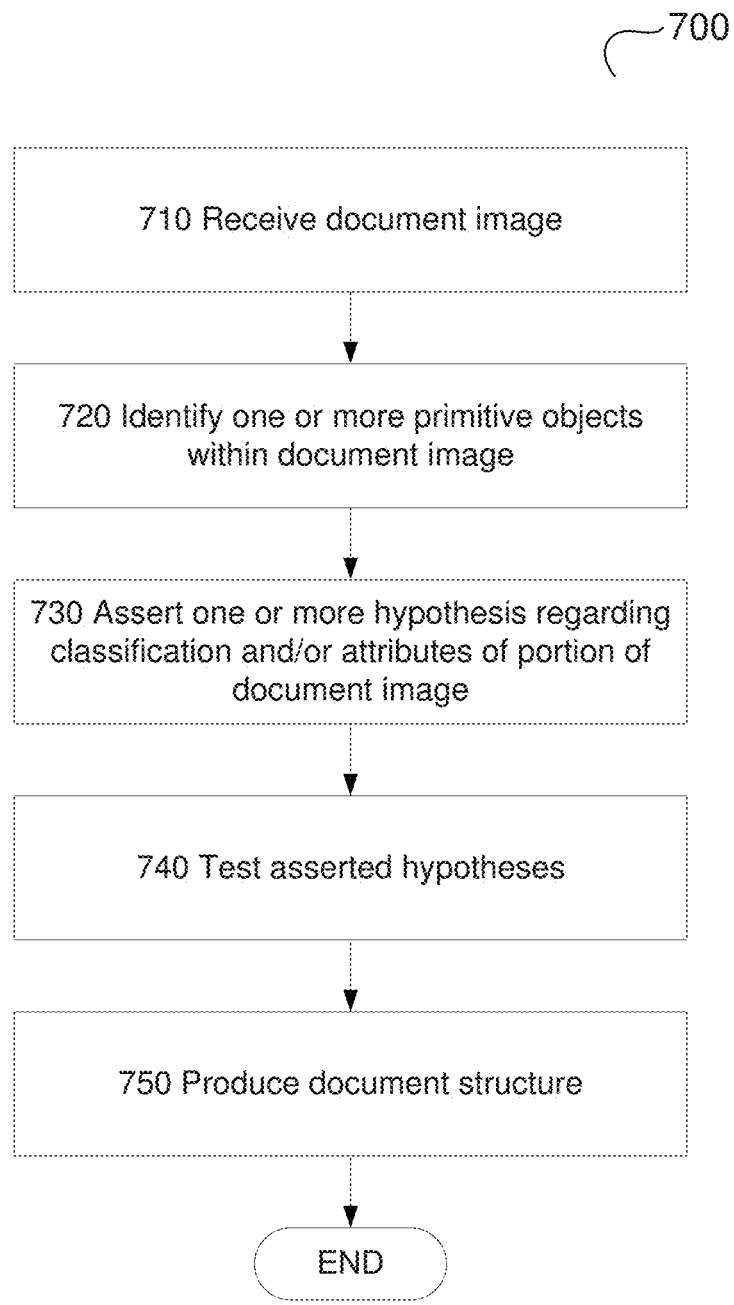
FIG. 7 depicts a flow diagram of one illustrative example of a method for processing electronic documents, in accordance with one or more aspects of the present disclosure.

FIG. 7 depicts a flow diagram of one illustrative example of a method 700 for processing electronic documents, in accordance with one or more aspects of the present disclosure. Method 700 and/or each of its individual functions, routines, subroutines, or operations may be performed by one or more processors of the computer device (e.g., computing device 100 of FIG. 1) executing the method. In certain implementations, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other.

At block 710, the computing device performing the method may receive an image of at least a part of a document (e.g., a document page). In an illustrative example, the image may be acquired via an optical input device 180 of example computing device 100 of FIG. 1.

At block 720, the computing device may identify one or more primitive objects (e.g., separators, word fragments) to be processed within the image.

At block 730, the computing device may assert one or more hypotheses with respect to the physical structure of the document. Such hypotheses may include one or more hypotheses with respect to classification and/or attributes of portions (e.g., rectangular objects) of the document image. In various illustrative examples, with respect to a particular rectangular object located within the image, the computing device may assert and test the following hypotheses: the object comprises text, the object comprises a picture, the object comprises a table, the object comprises a diagram, and the object comprises a screenshot image, as described in more details herein above.

At block 740, the computing device may test the asserted hypotheses, to select one or more best hypotheses, as described in more details herein above.

At block 750, the computing device may produce the physical structure of at least a part of the document (e.g., document page) based on the best selected one or more hypotheses, as described in more details herein above. Responsive to completing the operations described herein above with references to block 750, the method may terminate.

Figure 8:
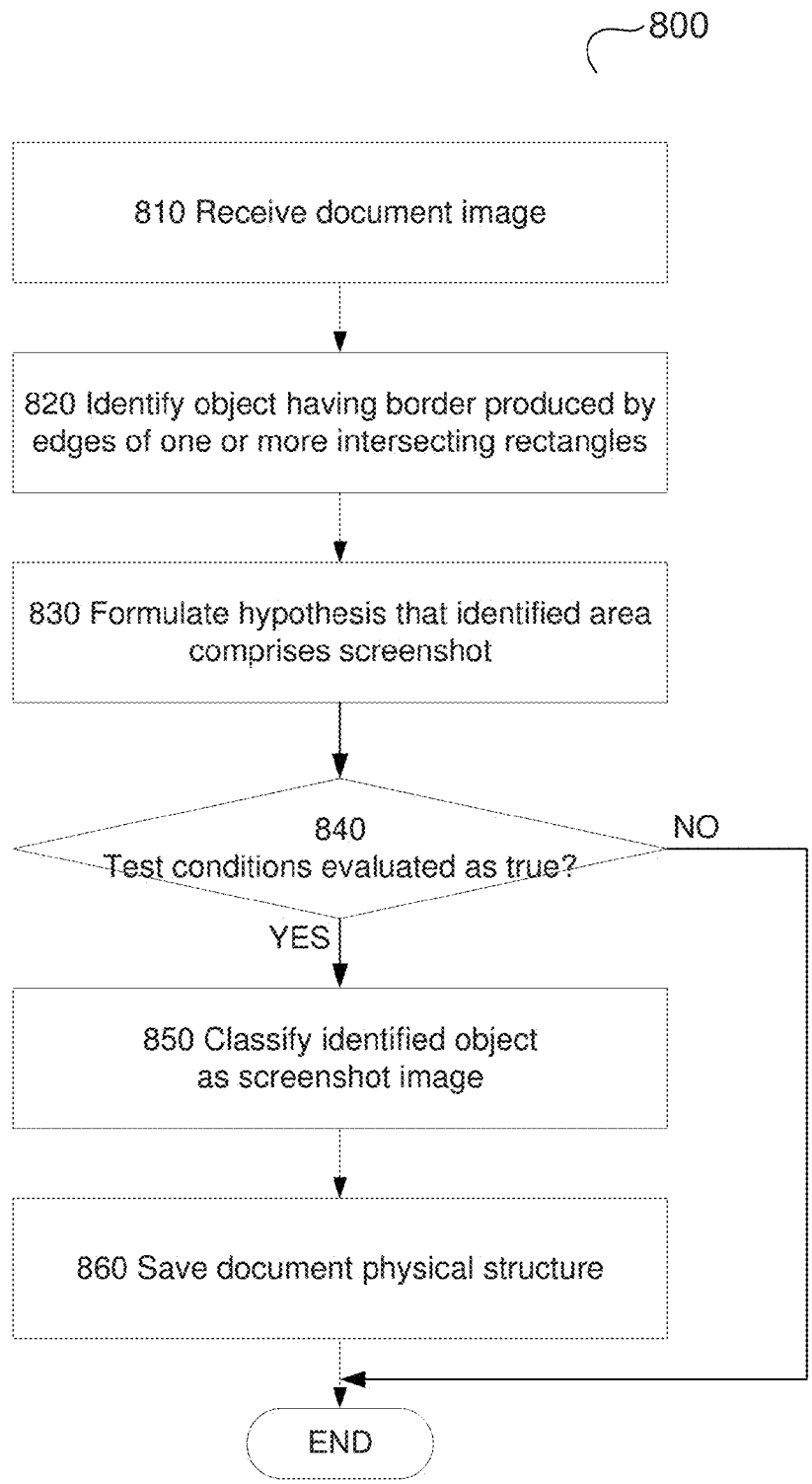
FIG. 8 depicts a flow diagram of one illustrative example of a method for identifying screenshots within document images, in accordance with one or more aspects of the present disclosure.

FIG. 8 depicts a flow diagram of one illustrative example of a method 800 for identifying screenshots within document images, in accordance with one or more aspects of the present disclosure. Method 800 and/or each of its individual functions, routines, subroutines, or operations may be performed by one or more processors of the computer device (e.g., computing device 100 of FIG. 1) executing the method. In certain implementations, method 800 may be performed by a single processing thread. Alternatively, method 800 may be performed by two or more processing threads, each thread executing one or more individual functions, routines, subroutines, or operations of the method. In an illustrative example, the processing threads implementing method 800 may be synchronized (e.g., using semaphores, critical sections, and/or other thread synchronization mechanisms). Alternatively, the processing threads implementing method 800 may be executed asynchronously with respect to each other.

At block 810, the computing device performing the method may receive an image of at least a part of a document (e.g., a document page). In an illustrative example, the image may be acquired via an optical input device 180 of example computing device 100 of FIG. 1.

At block 820, the computing device may identify, within the document image, one or more candidate polygonal objects having a visually distinct border comprising edges of one or more intersecting rectangles. Identifying the candidate object within the document image may comprise identifying three or more edges of the object's polygonal (e.g., rectangular) border. In certain implementations, one or more graphical primitives comprised by the object border may be provided by a visual separator (e.g., a straight line, or a substantially rectangular element) of a color which is visually distinct from the color of any neighboring element. In an illustrative example, a visual separator may have a substantially solid fill pattern comprising a single color. In another illustrative example, a visual separator may be represented by a line dissecting the background so that the background color on one side of the separator line is different from the background color on another side of the separator line. In yet another illustrative example, a visual separator may have a gradient fill pattern comprising one or more colors (e.g., a fill pattern gradually changing from a first intensity of the base color to a second intensity of the based color, or from a first solid color to a second solid color). In yet another illustrative example, a visual separator may be represented by an inverse background rectangular element comprising a text (e.g., a window title), such that the background color of the rectangular element is visually distinct from the background color of the neighboring document image objects, and the color of the text coincides with the background color of the neighboring document image objects, as described herein above.

At block 830, the computing device may, for each identified object, assert one or more hypotheses regarding classification and/or attributes of the portion of page image comprised by the identified object. In an illustrative example, with respect to the identified polygonal object, the computing device may assert a hypothesis that the object is a screenshot image, as described in more details herein above.

At block 840, the computing device may test the asserted hypothesis by evaluating one or more conditions associated with one or more attributes of the identified candidate object, as described in more details herein above. Responsive to determining that one or more testing conditions have been evaluated as true, the processing may continue at block 850; otherwise, the method may terminate (or another hypothesis with respect to the identified object may be asserted and tested).

At block 850, the computing device may classify the object as a screenshot image.

At block 860, the computing device may save the information regarding the physical structure of at least a part of the document comprising the screenshot image. Upon completing the operations described herein above with references to block 860, the method may terminate.

Figure 9:
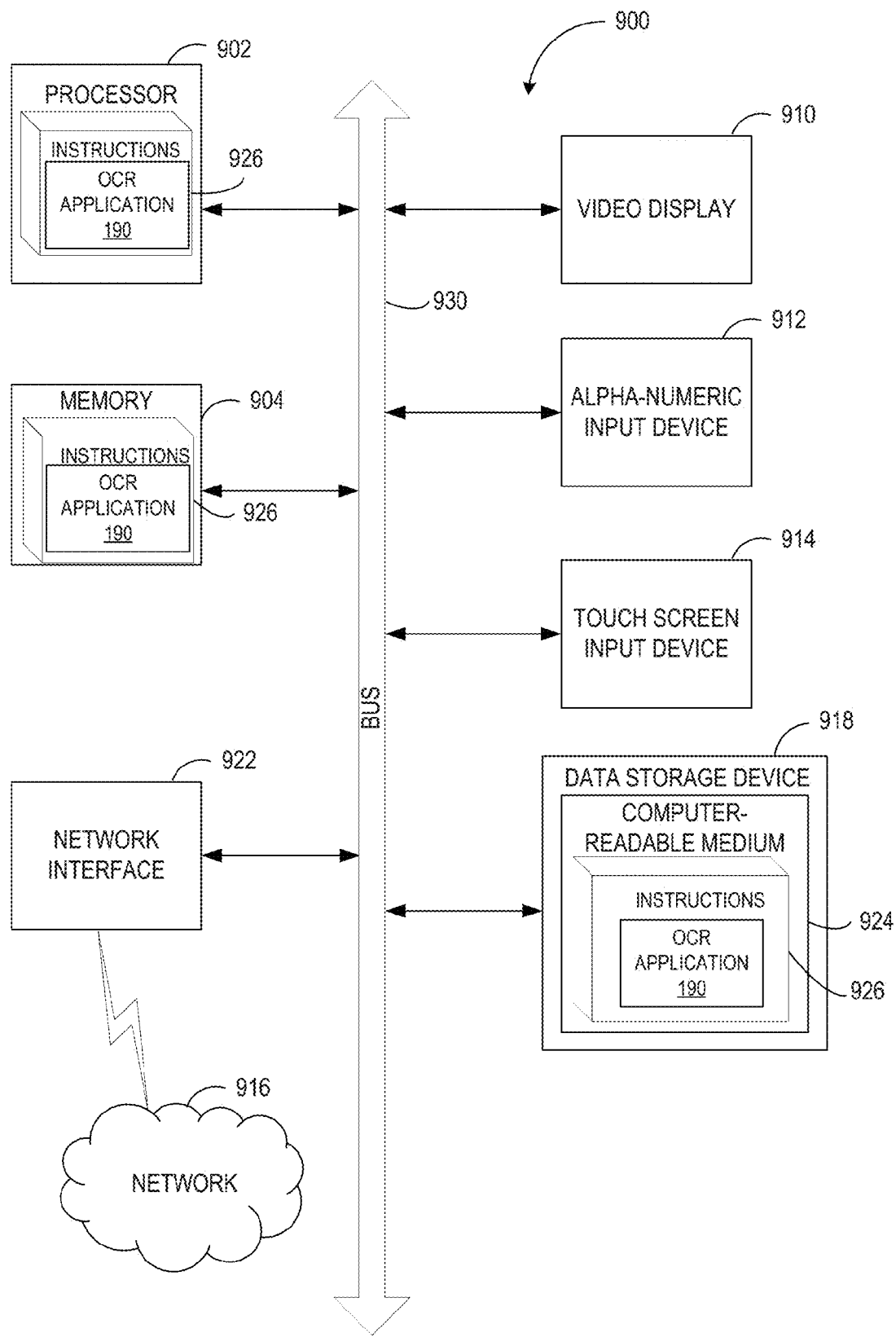
FIG. 9 depicts a more detailed diagram of an illustrative example of a computing device implementing the methods described herein.

FIG. 9 illustrates a more detailed diagram of an example computing device 900 within which a set of instructions, for causing the computing device to perform any one or more of the methods discussed herein, may be executed. The computing device 900 may include the same components as computing device 100 of FIG. 1, as well as some additional or different components, some of which may be optional and not necessary to provide aspects of the present disclosure. The computing device may be connected to other computing device in a LAN, an intranet, an extranet, or the Internet. The computing device may operate in the capacity of a server or a client computing device in client-server network environment, or as a peer computing device in a peer-to-peer (or distributed) network environment. The computing device may be a provided by a personal computer (PC), a tablet PC, a set-top box (STB), a Personal Digital Assistant (PDA), a cellular telephone, or any computing device capable of executing a set of instructions (sequential or otherwise) that specify operations to be performed by that computing device. Further, while only a single computing device is illustrated, the term "computing device" shall also be taken to include any collection of computing devices that individually or jointly execute a set (or multiple sets) of instructions to perform any one or more of the methodologies discussed herein.

Exemplary computing device 900 includes a processor 902, a main memory 904 (e.g., read-only memory (ROM) or dynamic random access memory (DRAM)), and a data storage device 918, which communicate with each other via a bus 930.

Processor 902 may be represented by one or more general-purpose processing devices such as a microprocessor, central processing unit, or the like. More particularly, processor 902 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute instructions 926 for performing the operations and functions discussed herein.

Computing device 900 may further include a network interface device 922, a video display unit 910, an character input device 912 (e.g., a keyboard), and a touch screen input device 914.

Data storage device 918 may include a computer-readable storage medium 924 on which is stored one or more sets of instructions 926 embodying any one or more of the methodologies or functions described herein. Instructions 926 may also reside, completely or at least partially, within main memory 904 and/or within processor 902 during execution thereof by computing device 900, main memory 904 and processor 902 also constituting computer-readable storage media. Instructions 926 may further be transmitted or received over network 916 via network interface device 922.

In certain implementations, instructions 926 may include instructions of method 800 for identifying screenshots within document images, and may be performed by application 190 of FIG. 1. While computer-readable storage medium 924 is shown in the example of FIG. 4 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computing device, or similar electronic computing device, that manipulates and transforms data represented as physical (e.g., electronic) quantities within the computing device's registers and memories into other data similarly represented as physical quantities within the computing device memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving an image of at least a part of a document;
   performing optical character recognition of at least the part of the image based on a physical structure;
   identifying, within the image, a polygonal object having a visually distinct border comprising a plurality of edges of one or more intersecting rectangles; and
   responsive to evaluating at least one condition associated with one or more attributes of the identified polygonal object, classifying the identified polygonal object as a screenshot image.

2. The method of claim 1, further comprising: asserting a classification hypothesis with respect to the identified polygonal object.

3. The method of claim 1, wherein the polygonal object is provided by a rectangular object.

4. The method of claim 1, wherein the border of the polygonal object comprises at least one visual separator provided by one of: a black separator, a gradient separator, or an inverse zone separator.

5. The method of claim 1, wherein identifying the polygonal object comprises identifying at least three mutually perpendicular visual separators comprised by the visually distinct border.

6. The method of claim 1, wherein evaluating the condition comprises identifying a window header element comprised by the polygonal object.

7. The method of claim 1, wherein evaluating the condition comprises identifying, within the polygonal object, a background having at least one of: a color or a fill pattern that is different from a background of the image.

8. The method of claim 1, wherein evaluating the condition comprises ascertaining that a ratio of a height of the polygonal object to a width of the polygonal object falls within a pre-defined range.

9. The method of claim 1, wherein evaluating the condition comprises identifying a callout graphical element associated with the polygonal object.

10. The method of claim 1, wherein evaluating the condition comprises identifying a plurality of grayscale items within the polygonal object.

11. The method of claim 1, wherein evaluating the condition comprises identifying, within the polygonal object, a first text object having a first font size, wherein the first font size is less than a second font size of a second text object that is located outside of the polygonal object.

12. The method of claim 1, wherein evaluating the condition comprises identifying, within the polygonal object, images of one or more graphical user interface (GUI) controls.

13. The method of claim 1, further comprising: producing a physical structure of at least the part of the image, the physical structure comprising a definition of a screenshot associated with the polygonal object.

14. The method of claim 13, further comprising:
   performing optical character recognition of at least the part of the image based on the physical structure;
   saving, using an image format, a portion of the image corresponding to the identified screenshot.

15. A computing device, comprising:
   a memory;
   a processor, coupled to the memory, the processor configured to:
   receive an image of at least a part of a document;
   performing optical character recognition of at least the part of the image based on a physical structure;
   identify, within the image, a polygonal object having a visually distinct border comprising a plurality of edges of one or more intersecting rectangles; and
   responsive to evaluating at least one condition associated with one or more attributes of the identified polygonal object, classify the identified polygonal object as a screenshot image.

16. The computing device of claim 15, wherein the border of the polygonal object comprises at least one visual separator provided by one of: a black separator, a gradient separator, or an inverse zone separator.

17. The computing device of claim 15, wherein evaluating the condition comprises identifying a window header element comprised by the polygonal object.

18. The computing device of claim 15, wherein evaluating the condition comprises identifying, within the polygonal object, a background having at least one of: a color or a fill pattern that is different from a background of the image.

19. The computing device of claim 15, wherein evaluating the condition comprises ascertaining that a ratio of a height of the polygonal object to a width of the polygonal object falls within a pre-defined range.

20. The computing device of claim 15, wherein evaluating the condition comprises identifying a callout graphical element associated with the polygonal object.

21. The computing device of claim 15, wherein evaluating the condition comprises identifying a plurality of grayscale items within the polygonal object.

22. The computing device of claim 15, wherein evaluating the condition comprises identifying, within the polygonal object, a first text object having a first font size, wherein the first font size is less than a second font size of a second text object that is located outside of the polygonal object.

23. The computing device of claim 15, wherein evaluating the condition comprises identifying, within the polygonal object, images of one or more graphical user interface (GUI) controls.

24. A computer-readable non-transitory storage medium comprising executable instructions that, when executed by a computing device, cause the computing device to perform operations comprising:
   receiving an image of at least a part of a document;
   performing optical character recognition of at least the part of the image based on a physical structure;

identifying, within the image, a polygonal object having a visually distinct border comprising a plurality of edges of one or more intersecting rectangles; and responsive to evaluating at least one condition associated with one or more attributes of the identified polygonal object, classifying the identified polygonal object as a screenshot image.

25. The computer-readable non-transitory storage medium of claim 23, further comprising executable instructions causing the computing device to: produce a physical structure of at least the part of the image, the physical structure comprising a definition of a screenshot associated with the polygonal object.

\* \* \* \* \*